United States Patent [19]

Berndlmaier et al.

[11] Patent Number: 4,910,243

[45] Date of Patent: Mar. 20, 1990

[54] DINONYLNAPHTHALENE SULFONIC ACID AND DERIVATIVES THEREOF AS DISPERSANTS IN HIGH SOLIDS COATINGS

[75] Inventors: Rudolph Berndlmaier, Shelton; Richard J. Shain, Fairfield, both of Conn.

[73] Assignee: King Industries, Inc., Norwalk, Conn.

[21] Appl. No.: 137,483

[22] Filed: Dec. 23, 1987

[51] Int. Cl.$^4$ .............................................. C08K 5/00
[52] U.S. Cl. ................................... 524/160; 106/503; 252/363.5; 524/168; 524/170; 524/171
[58] Field of Search ............................ 106/308 S, 503; 524/160

[56] References Cited

U.S. PATENT DOCUMENTS

| | | |
|---|---|---|
| 2,764,548 | 9/1956 | King et al. |
| 3,627,723 | 12/1971 | Kealy et al. ........................ 524/160 |
| 3,937,678 | 2/1976 | Yasuda et al. |
| 4,120,817 | 10/1978 | Hummelstedt et al. ............. 423/24 |
| 4,157,991 | 6/1979 | Pilla ................................. 106/14.26 |
| 4,205,865 | 6/1980 | Lange et al. ........................ 106/21 |
| 4,238,387 | 12/1980 | Antonelli et al. .................. 524/601 |
| 4,360,612 | 11/1982 | Trumball et al. ................... 524/160 |
| 4,477,617 | 10/1984 | Murphy ............................. 524/160 |
| 4,647,647 | 3/1987 | Haubennestal et al. |

FOREIGN PATENT DOCUMENTS

| | | | |
|---|---|---|---|
| 549541 | 12/1957 | Canada ............................. 524/160 |
| 619721 | 5/1961 | Canada ............................. 106/503 |
| 130942 | 6/1978 | German Democratic Rep. ................................. 524/160 |
| 224042 | 6/1985 | German Democratic Rep. ................................. 524/160 |

Primary Examiner—Lewis T. Jacobs
Assistant Examiner—David W. Woodson
Attorney, Agent, or Firm—Hedman, Gibson, Costigan & Hoare

[57] ABSTRACT

Dinonylnaphthalene sulfonic acid, derivatives thereof and mixtures of any of them, are effective as dispersants for nonaqueous fluid compositions containing finely divided solid particles when added in an effective amount less than that necessary to act as a catalyst for any organic binder resin comprising an aminoplast and coreactants in the composition or in formulations made from the composition.

9 Claims, 3 Drawing Sheets

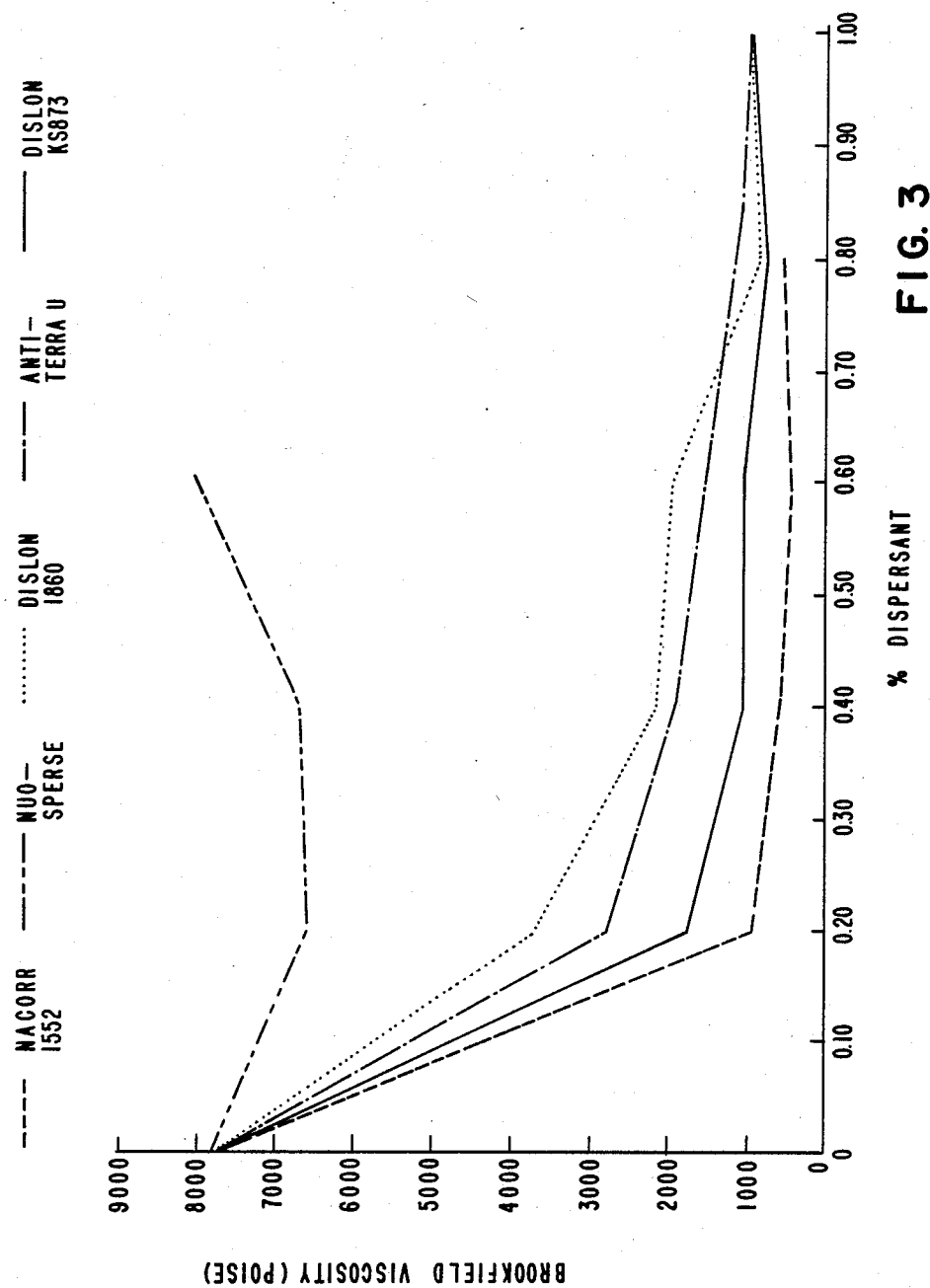

DINONYLNAPHTHALENE SULFONIC ACID AND DERIVATIVES THEREOF AS DISPERSANTS IN HIGH SOLIDS COATINGS

The present invention relates to the use of dinonylnaphthalene sulfonic acid and derivatives thereof as pigment dispersants in mill grinds and high solids coating compositions made therefrom.

BACKGROUND OF THE INVENTION

In order to obtain high solids (pigment, etc.) coatings in nonaqueous fluid systems such as paints, enamels and the like, it is necessary to reduce the level of powerful mechanical forces in order to provide acceptable application viscosities. In other words, reducing the viscosity of mill base is an effective procedure in raising the solids content in a coating. Various additives have been developed which are aimed at achieving a low viscosity. For instance, it is well known in the art that the proper choice and amount of dispersant, dispersing resin and/or catalyst reduces the viscosity of coatings. Higher solids and lower VOC can be achieved by such modification, as well as improvements in film properties.

Pigment wetting may be influenced by the viscosity of the mill base, the spatial nature of the pigment particles and the surface treatment characteristics of the pigment. Surface treatments create more hydrophilic particles and lower interfacial energy between them. In an efficient grinding procedure, pigment particles formed have increased interfacial energy between them. Particles of very fine size will tend to reagglomerate and are more difficult to keep in a well dispersed state due to London/van der Waal's forces by which the solids are attracted to each other.

Low viscosity dispersing resins are used to achieve low viscosity and high solids coatings. For example, K-CRYL ® 200-6 acrylic oligomer (75% solids), commercially available from King Industries, Inc., can dramatically reduce pigment association by improving the wetting of the pigments. End groups of the polymer are oriented away from pigment particles and are compatible with binder constituents. The improved wetting results in production of more primary pigment particles and a higher pigment-to-binder concentration. Grinding time is reduced and nonvolatile content increased by the acrylic modification. However, resins can often present problems in pigment dispersion, particularly in low molecular weight resins where pigments have a tendency to associate, leading to higher viscosity. Such association also increases with the addition of solvents.

Dispersing resins of higher molecular weight and having less functionality than dispersants must be used at higher levels than the dispersants. Because of their lower functionality and higher molecular weight, they have less adverse effect than dispersants. However, unexpected increases or decreases in viscosity can be caused by chemical/physical interactions between combinations of certain resins and pigments.

Dispersing agents are also often used in attempting to solve this problem. Dispersants are surface active agents, and therefore, affect the interfacial energies between pigment particles. Proper amounts of absorbed dispersants and wetting agents prevent the reagglomeration of particles formed in the grinding of mill base. Typical dispersants are bifunctional molecules with an ionic end and an organophilic end. In order to optimize the use of dispersants, enough must be used to provide a layer around the pigment particles, thereby preventing reassociation. However, excessive amounts of dispersants reduces their effectiveness.

Many different dispersing agents are known in the art. For example, U.S. Pat. No. 3,937,678 (Yasuda et al.) discloses a method for improving the rheological and suspension properties of a paint or other nonaqueous fluid system containing pigments or other solids by adding certain amide waxes and certain emulsifiable polyethylene waxes to the same. It is stated therein that the amide and polyethylene waxes used together provide a synergistic effect.

More recently, U.S. Pat. No. 4,647,647 (Haubennestal et al.) discloses the use of addition compounds obtained from the reaction of polyisocyanates, hydroxyl compounds, compounds having Zerewitinoff-active hydrogen and at least one basic group containing nitrogen, optionally in the presence of solvents and/or reaction catalysts as suitable dispersing agents.

Other dispersants are well-known in the art as being useful for reducing the viscosity of nonaqueous fluid systems. Such dispersants include Dislon ®-type additives, commercially available from Kusumoto Chemicals, Ltd. In particular, Dislon ® 1860 is an anionic salt of a long chain polyaminoamide with a high weight polyester acid, and Dislon ® KS-873N is an amine salt of a polyether ester acid. These additives may be added at about 0.2-1.5% by weight of paint. Both of the aforementioned Kusumoto additives improve paint gloss and enhance and stabilize pigment dispersion, although they are preferentially used for different applications based upon their particular properties.

Other additives which have been found to be useful as dispersants include the Anti-Terra ®-U type additives, commercially available from BYK-Chemie. These additives are salts of unsaturated polyamineamides and higher molecular weight acidic esters. The Anti-Terra-U additives also provide improved gloss and improve the stabilization of the dispersion.

Yet another class of additives comprising modified alkyds and commercially available from NUODEX, Inc. as NUOSPERSE ®, have been useful as pigment dispersing agents. When added in amounts of 2-4% based on the weight of pigment, the NUOSPERSE-type dispersants also improve product quality and improve dispersion stability.

Still another class of additives comprising calcium petroleum sulfonates are offered by the Lubrizol Corporation as pigment dispersing agents.

Dinonylnaphthalene sulfonic acids, commercially available from King Industries as HDNNS ® acid, and a process for their manufacture are taught in U.S. Pat. No. 2,764,548 (King et al.). King et al. disclose the fact that these compounds and salts thereof are very effective rust and corrosion inhibitors in motor fuels and lubricating oils. Dinonylnaphthalene acids and sulfonates are also well known in the art to be effective as catalysts for organic binder resins in nonaqueous fluid compositions and in coating systems comprising the nonaqueous fluid composition. When used as such catalysts, the dinonylnaphthalene acids and sulfonates are provided in amounts of about 0.5-5 percent by weight based on the weight of total resin solids.

It has now surprisingly been discovered that certain dinonylnaphthalene sulfonic acids and sulfonates function as very efficient dispersants in high solids coatings when used in amounts about one-tenth as great as when used as catalysts as described above. Furthermore, it has been found that when used in optimal quantities, the dinonylnaphthalene sulfonic acids and sulfonates provide similar physical properties to nonaqueous fluid systems such as paints, etc., but provide surprisingly improved viscosity reduction over prior art dispersants.

DESCRIPTION OF THE DRAWINGS

In the drawings,

FIG. 3 is a graphical representation of viscosity versus concentration in a composition of optimum blend content taken from FIG. 2, the different curves representing commercially available dispersants of the prior art and a dispersant in accordance with the present invention.

SUMMARY OF THE INVENTION

Figure 1:
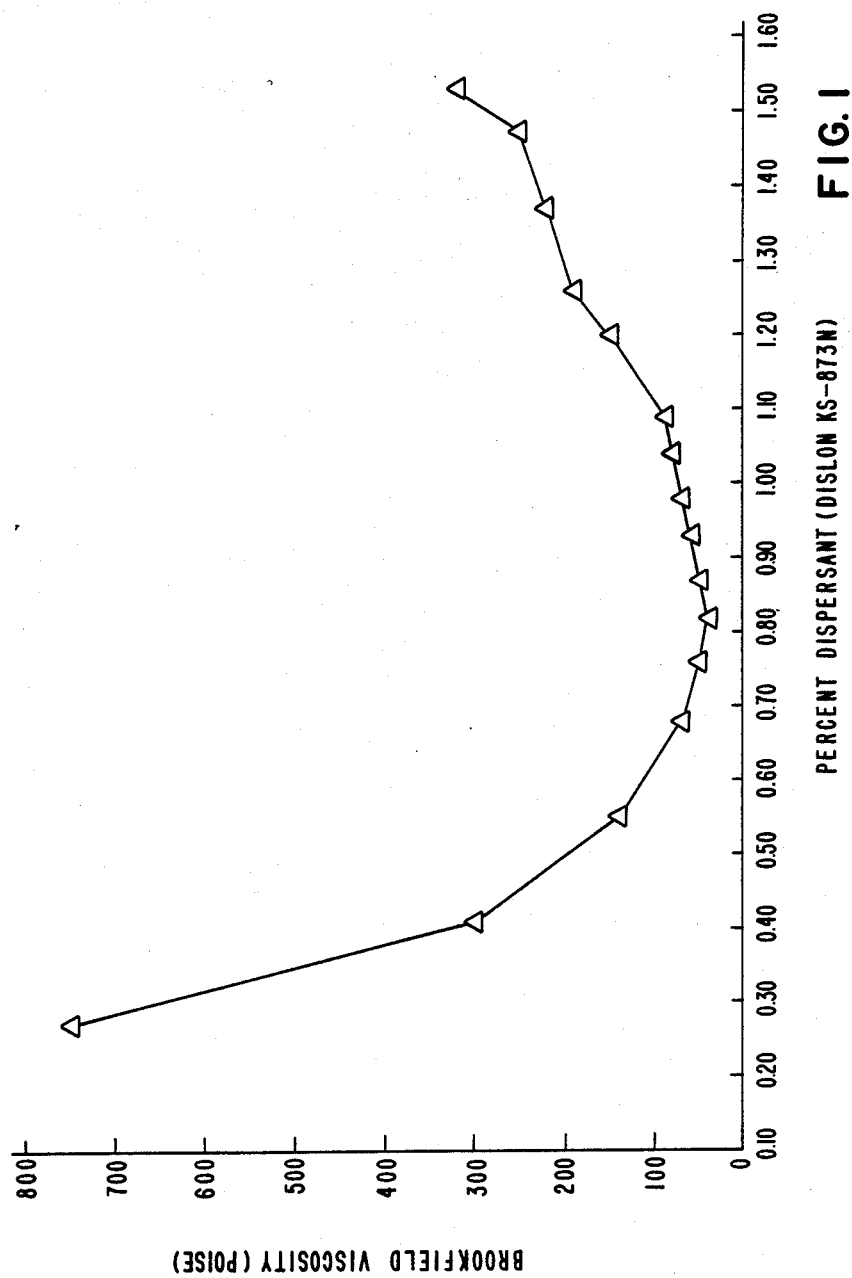
FIG. 1 is a graphical representation of viscosity versus concentration in a nonaqueous fluid compositions containing finely divided solid particles to which a prior art dispersant is incrementally added.

In accordance with the present invention there are provided nonaqueous fluid compositions containing finely divided solid particles, wherein the composition comprises an amount of a dispersant selected from dinonylnaphthalene sulfonic acid, derivatives thereof or a mixture of any of them, in a small amount effective to improve rheological and suspension properties of the composition but less than an amount effective to catalyze any organic binder resin comprising an aminoplast and coreactants in the composition or in a coating system comprising the composition. Preferably the dispersant comprises dinonylnaphthalene sulfonic acid, a salt thereof, an ester of said acid or a mixture of any of the foregoing.

As one embodiment, the present invention provides a mill grind comprising (i) a pigment; (ii) a vehicle; and (iii) a dispersant as above defined in an amount of from about 0.07 to about 0.7 percent, preferably about 0.4, by weight based on the weight of the pigment. Also features of the invention are enamels made from the mill grind and a letdown vehicle, the dispersant comprising 0.02 to 0.2, preferably 0.10 to 0.15, percent by weight based on the enamel.

In addition to the above embodiments, the present invention provides a method for improving the rheological and suspension properties of a mill grind comprising (i) finely divided solid particles, and (ii) a non-aqueous fluid system, said method comprising adding to said mill grind, (iii) a dispersant as defined above in an amount of from about 0.07 to about 0.7 preferably about 0.4 percent by weight based on the weight of said pigment. The invention also contemplates improving such properties in enamels by adding 0.02 to 0.2, preferably 0.10 to 0.15 percent by weight based on the enamel of the dispersant.

More preferably, the dispersant will comprise dinonylnaphthalene sulfonic acid, a metal salt of dinonylnaphthalene sulfonic acid, an amine salt of dinononylnaphthalene sulfonic acid or an ester of dinonylnaphthalene sulfonic acid. Special mention is made of compositions and methods in which the dispersant comprises zinc dinonylnaphthalene sulfonate.

DETAILED DESCRIPTION

The dinonylnapthalene sulfonic acids of the present invention may be prepared in accordance with the process disclosed in U.S. Pat. No. 2,764,548 (King et al), or by other methods which are well known in the art.

In general, dinonylnaphthalene sulfonic acids may be prepared by alkylating naphthalene with highly branched nonenes, for example, tripropylene, with a suitable catalyst such as hydrogen fluoride or anhydrous aluminum chloride in a suitable anhydrous solvent containing the naphthalene. The use of suitable solvents such as naphtha, sulfur dioxide, nitrobenzene or a mixture of benzene and nitrobenzene in the alkylation result in a high yield of dinonylnapthalene and relative ease of recovery of the solvent.

In the process of forming sulfonic acids and salts from dinonylnapthalene, the dinonylnaphthalene is dissolved in a solvent which is free of aromatics or olefins which under the condition of the reaction would disadvantageously react with sulfonic acid. The aforementioned solvents are suitable for the sulfonation reaction. The sulfonic acid, preferably oleum, is introduced into the solution of dinonylnaphthalene at the desired temperature and agitation. After the reaction is complete, the product is subjected to successive water washings and stratifications in each of which the water-insoluble, but oil soluble, dinonylnaphthalene sulfonic acid accumulates in an upper layer.

The commercially available nonenes may be obtained as by-products of the petroleum refining operations and include small amounts of other olefins and other hydrocarbons. Suitable products containing from about 70 to about 90 percent of nonene produced by polymerization are available from the petroleum refiners. Preferably, the nonenes which are used are olefins, the major portion of which are tertiary olefins. They may be further characterized as polymers of propylene or propene, especially polymeric tripropylene which is a mixture of isomers having from $\frac{1}{3}$ to $\frac{1}{4}$ terminal methyl groups, the double bond being distributed along the chain. Especially effective nonenes are made commercially by the trimerization of propylene by an acid catalyst such as phosphoric acid.

The inorganic salts of the dinonylnaphthalene sulfonates, such as sodium, potassium, magnesium, calcium, zinc, or barium, may be advantageously prepared after the water washes have been made and the sulfonic acid containing product is substantially free of sulfuric and disulfonic acid. It is also advantageous to determine the neutralization equivalent of the sulfonic acid layer and calculate the weight of metal, etc. to be added in forming the salt in the neutralization of the sulfonic acid. The ammonium and amine salts of the sulfonic acids may be produced in a similar manner. Other derivatives such as the sulfonate esters can be made in conventional ways, for example, by addition of epoxy functional compounds to the sulfonic acid in non aqueous systems. The zinc salt may be produced for example, by adding 3 parts by weight of zinc oxide to 42 parts by weight of a 40 percent solution of dinonylnapthalene sulfonic acid in mineral seal oil, and heating the mixture to 50°-60° C.

In preferred embodiments of the present invention, the dispersant comprises 42 percent epoxy ester of dinonylnaphthalene sulfonic acid in xylene/MIBK, commercially available from King Industries as NACURE® 1419; 50 percent zinc dinonylnaphthalene sulfonate in butyl cellosolve, commercially available as NA- CORR® 1552; 45 percent basic barium dinonylnaphthalene sulfonate in 8.1 percent BaOH (H₂O) and 46.9 percent mineral spirits, commercially available as NASUL® BSB/MS, 50 percent barium dinonylnaphthalene sulfonate in mineral spirits, commercially available as NACORR® 1151, 50 percent HDNNS® dinonylnaphthalene sulfonic acid in butyl cellosolve, commercially available as NACURE® 1051; and 25 percent amine blocked dinonylnaphthalene sulfonate in 75 percent xylene and 5 percent heptane, commercially available as NACURE® 1323 from King Industries.

DETAILED DESCRIPTION OF THE PREFERRED EMBODIMENTS

The following examples illustrate the present invention. They are not to be construed to limit the claims in any manner whatsoever.

EXAMPLE 1

The viscosity stability of a control blend having no dinonylnaphthalene sulfonic acid catalyst is determined for the purpose of comparison. First, the grind is predispersed with a Cowles disperser and then ground overnight in a pebble mill to 9–10 on a PC Hegman gauge. Thereafter, 686.3 g of the grind is hand-stirred into the preblend letdown. The components of the grind, the preblend letdown, and the final composition are provided in Table 1. Next, the viscosity reduction for a 200 g sample of the composition which has a solvent blend of methoxypropyl acetate (PM acetate®): methylethyl ketone (MEK): (80:20) is determined. Then, according to this invention, at a 73.2% solids content, 1.7% of NACURE® 1419 is included and the viscosity measurement is repeated. The results in Table 2 show a significant decrease in viscosity caused by the dispersing effect of the dinonylnaphthalene sulfonate ester.

EXAMPLES 2–5

The variables for viscosity/percentage solids adjustment of compositions which include dinonylnaphthalene sulfonic acid catalysts are compared to control samples which are not provided with the catalysts. Example 2 does not have a catalyst included, while Example 3 uses NACURE® 1419, and Examples 4 and 5 use NACURE® 1051 and NACURE® 1323, respectively. Table 3 provides variables for viscosity/percent solids adjustment. In each of these Examples, 200 g of paint and 94.4 g total resin solids (TRS) (or 47.2% TRS) are used. This table demonstrates levels of dinonylnaphthalene sulfonic acids and derivatives typically used for catalyzed high solids coatings.

EXAMPLES 6–12

The viscosity of compositions with and without Table 3 dinonylnaphthylene sulfonate catalysts are taken at 25° C. with a #4 Ford Cup. The results are shown in Table 4. The compositions provided with the dinonylnaphthlene catalysts (Examples 6–8) showed surprising viscosity reduction as compared to the compositions without the catalyst (Examples 9–12). At catalytic levels some dispersant activity is thus seen to occur.

EXAMPLES 13–16

The viscosity stability at 50° C. of three compositions including catalytic amounts of dinonylnaphthalene sulfonic acid (DNNS®) and its derivatives (Table 3) are compared to a control composition without any DNNS® for 12 week period. The results are shown in Table 5. Low initial viscosity of Examples 14, 15 and 16 demonstrates some dispersant activity, while their 12 week higher viscosity indicates their catalytic activity.

EXAMPLES 17–20

A control composition is prepared using the ingredients shown in Table 6. Thereafter, three different DNNS® derivatives were added at 1.7 percent, based on the total resin solids. Example 18 includes NASUL® BSB/MS, Example 19 includes NACORR® 1151, and Example 20 includes NACORR® 1552. The viscosity of these samples is compared to that of the control (Example 17) at varying shear rates. The results are shown in Table 7. The compositions containing the DNNS catalysts provided similar behavior to the DNNS derivatives previously tested.

EXAMPLES 21–25

The foregoing data demonstrate some dispersant activity at catalytic levels. Experiments were then carried out to determine optimum levels for dispersant activity.

A composition is prepared using a commercial dispersant, DISLON® KS-873N, using a standard industry dispersant demand test. The composition comprised 63% TiPure®-960 titanium dioxide pigment concentrate, 23% resin solids K-FLEX® 188 resin, and 14% methyl isobutyl ketone solvent. The dispersant was added incrementally and the viscosity was measured to determine the optimum level. The results are set forth graphically in FIG. 1. The optimum is seen to be at 0.8% by weight based on the pigment. This is not unexpected for commercial dispersants.

A composition is prepared which includes 65.5 percent TiPure® R-960 concentrate, a commercial TiO₂ pigment available from E.I. du Pont & Company; 0.8 percent DISLON® KS-873N dispersant (based on pigment); 8 percent MIBK solvent; and 25 percent resin solids. When the 25 percent resin solids is K-FLEX® 188 resin, a 100% solids polyester polyol commercially available from King Industries, Inc., the Brookfield viscosity is 520 poise. This is also not unexpected for a commercial dispersant.

Figure 2:
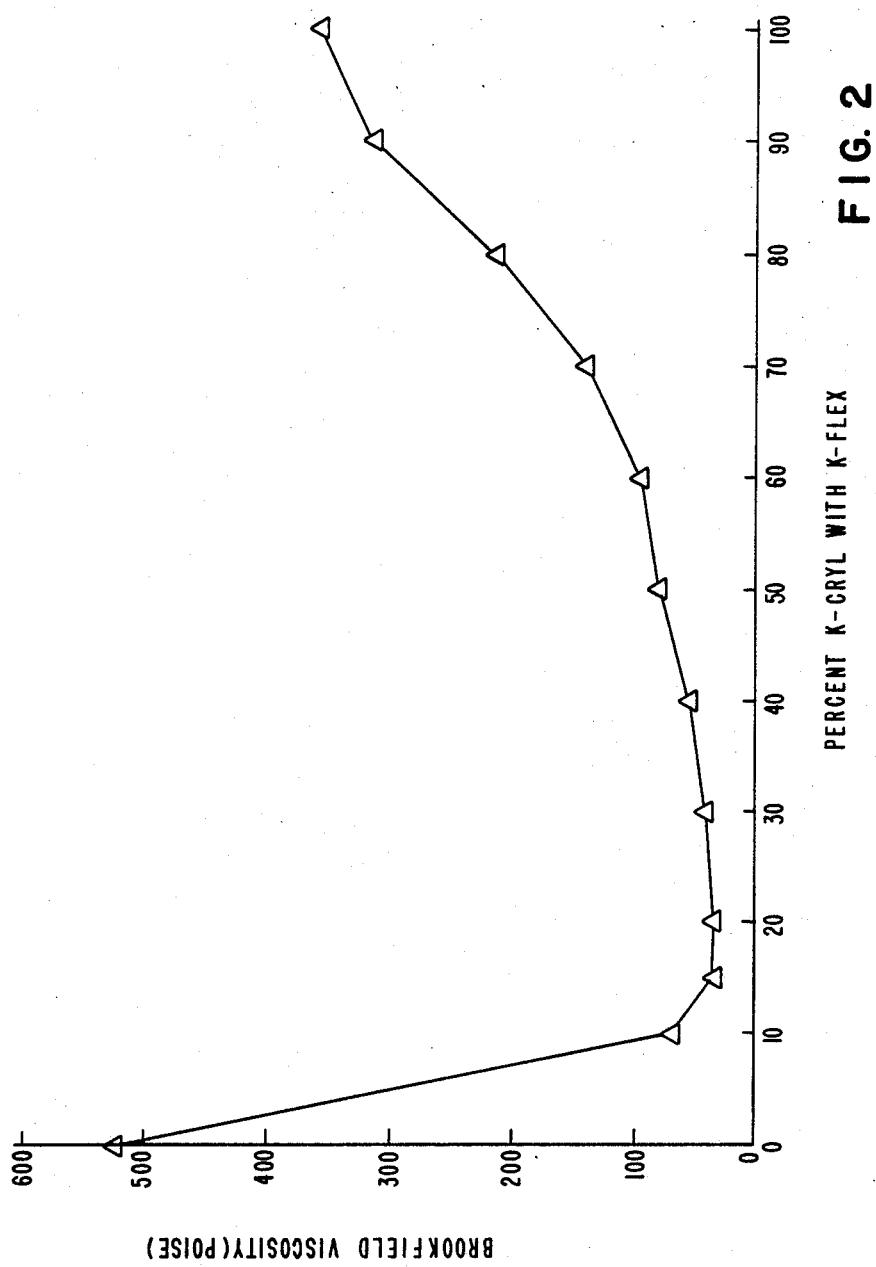
FIG. 2 is a graphical representation of viscosity versus resin blend composition in a composition employing the optimum dispersant content taken from FIG. 1.

The K-FLEX® 188 resin is incrementally replaced with K-CRYL® 200-6 resin, an acrylic polyol commerically available from King Industries, Inc. The results of this are graphically displayed in FIG. 2. It is seen that the Brookfield viscosity decreases to a minimum viscosity of 35 poise. At this minimum point, the total resin solids are 85 percent K-FLEX® 188 resin and 15 percent K-CRYL® 200-6 resin. The optimum dispersing K-FLEX® 148 resin concentration that was achieved for this system then is used to compare dispersant efficiency by running dispersant demand curves as set forth above.

FIG. 3 shows a 70 percent TiPure R-960 concentrate in 28.6 percent combined K-FLEX®-148: K-CRYL® 200-6 85:15 w/w resin solids and 1.4 percent MIBK solvent. Without dispersants it has a Brookfield viscosity of 7800 poise.

The dispersant demand curves illustrated in FIG. 3 show compositions containing DISLON® KS873N (Example 21), ANTI-TERRA U® (Example 22), DISLON® 1860 (Example 23), NUOSPERSE® 657 (Example 24), and NACORR® 1552 (Example 25), as the dispersing agents, respectively.

As can be seen by the results provided in FIG. 3, the dinonylnaphthalene sulfonate is most effective as a dispersant. Moreover, although four of the five dispersants affected viscosity equally at 1 percent concentration, there were marked differences at smaller concentrations. NACORR ® 1552, a 50 percent active solution of zinc DNNS in butyl cellosolve, was the most efficient dispersant.

EXAMPLES 26-27

Catalysts, such as DNNS ® sulfonates, are usually added at much higher concentrations than those levels common for dispersants. This can negate the effect of any other dispersant present by creating a dispersant excess as shown in FIG. 1. The use of a nonionic catalyst reduces this effect.

NACURE ® 1419, a partially ionic, epoxy blocked DNN sulfonate with a nonionic, covalent bond is used to prepare Examples 26-29 which to lead low volatile organic content (VOC) coatings.

Table 8 shows two different low VOC formulations. The first coating, Example 26, utilizes DISLON ® KS-873N as the dispersant.

The second coating, corresponding to Example 27, uses NACORR ® 1552 as the dispersant. These coatings utilize mill bases from Examples 21-35.

The resultant physical properties of these compositions (Table 8) show that the dinonylnaphthalene sulfonates, when used in concentrations about one-tenth as great as when used as catalysts, are effective dispersants which provide comparable physical properties to those compositions provided with prior art dispersants, even at one-half of the concentration.

TABLE 1

| CONTROL FORMULATION | |
|---|---|
| | Amount |
| Grind | |
| Cargill 5770[1] | 163.1 g |
| Tronox ® CR-800[2] | 693.7 g |
| PM Acetate[3] | 76.0 g |
| MEK | 67.2 g |
| Preblend letdown | |
| Cargill 5770 | 413.2 g |
| Hexamethoxymethylmelamine (4) | 148.7 g |
| Dislon ® L-1980 (5) | 2.5 g |
| PM Acetate | 12.9 g |
| PE/Melamine | 75/25 |
| Pigment/Binder | 0.8/1.0 |
| Enamel/Solids | 85.0% |
| Binder Solids-Total Resin Solids | 47.2% |
| VOC, Calc. (lbs/gal.) | 1.90 |
| #4 Ford Cup Viscosity | 360" |

(1) Polyester resin, Cargill, Inc.
(2) Titanium dioxide pigment, Kerr-McGee Chemical Corp.
(3) Methoxypropyl acetate, Arco Chemical Company
(4) Cymel ® 303resin, American Cyanamid Co. or Resimene ®747, Monsanto Co.
(5) Kusumoto Chemicals, Ltd.

TABLE 2

Evaluation of Viscosity Reduction for a 200 g Sample with PM Acetate: MEK blend (80:20)

| Enamel % Total Solids | #4 Ford Cup Viscosity | |
|---|---|---|
| 78% | 75" | |
| 75% | 46" | |
| 73.5% | 38" | |
| 73.2%*(73.3%) | 29" | Catalyzed with 1.7% NACURE ® 1419 |

*73.5% Sample with 1.7% NACURE ® 1419 on TRS calculates to be a 73.2% total solids excluding unsulfonated residue (USR) & epoxy. Actual solids including acid, USR & epoxy are 73.3%

TABLE 3

Variables for Viscosity/% Solids adjustment

| Example | Component | % Active* | % Solids | % Catalyst** |
|---|---|---|---|---|
| 2*** | Paint | — | 85 | — |
| 3 | NACURE ® 1419 | 30 | 50 | 1.7 |
| 4 | NACURE ® 1051 | 50 | 57 | 1.1 |
| 5 | NACURE ® 1323 | 21 | 24 | 2.5 |

*Based on dinonylnaphthalene sulfonic acid
**Based on total Resin Solids (47.2%)
***Control

TABLE 4

Viscosity adjustment to 34" on #4 Ford Cup

| | | Weight (g) | | | Total | Total | % Total | Viscosity (25° C.) |
|---|---|---|---|---|---|---|---|---|
| Example | Catalyst | Paint | Catalyst | Solvent[1] | Wt. (g) | Solids (g) | Solids | #4 Ford Cup |
| 6 | NACURE ® 1419 | 200 | 1.59 | 23.10 | 224.69 | 170.80 | 76.0 | 34.6 |
| 7 | NACURE ® 1323 | 200 | 2.36 | 22.07 | 224.40 | 170.57 | 76.0 | 35.2 |
| 8 | NACURE ® 1051 | 200 | 1.04 | 23.42 | 224.46 | 170.59 | 76.0 | 35.8 |
| 9* | None | 200 | 0.00 | 23.68 | 223.68 | 170.00 | 76.0 | 51" |
| 10 | None[2] | 200 | 0.00 | 23.68 | 223.68 | 165.52 | 74.0 | 38.5" |
| 11 | None[2] | 200 | 0.00 | 23.68 | 223.68 | 164.63 | 73.6 | 35.7" |
| 12 | None[3] | 300 | 0.00 | 23.68 | 223.68 | 164.63 | 73.6 | 46" |

*Control
[1]Solvent Blend: PM Acetate/MEK (80/20)
[2]Control adjusted to lower solids (73.6%) to reach spray viscosity
[3]After 3 hours, the control viscosity increased to 46"; showing thixotropic behavior.

TABLE 5

Brookfield Viscosity Stability Study

| Example | Sample | % Enamel Solids | Initial* | cps (% Scale) 1 week** | (cps) 3 weeks |
|---|---|---|---|---|---|
| 13 | Control | 73.6 | 320 (70%) | 340 (70%) | 322 |
| 14 | NACURE ® 1419 | 76.0 | 167 | 212 (44%) | 245 |
| 15 | NACURE ® 1323 | 76.0 | 161 | 237 (50%) | 377 |
| 16 | NACURE ® 1051 | 76.0 | 167 | 370 (77%) | 605 |

| Example | Sample | 6 weeks | 9 weeks | 12 Weeks |
|---|---|---|---|---|
| 13 | Control | 367 | 324 (60 RPM) | 327 (60 RPM) 337 (30 RPM) |

TABLE 5-continued

| Brookfield Viscosity Stability Study | | | | |
|---|---|---|---|---|
| 14 | NACURE ® 1419 | 337 | 354 (60 RPM) | 459 (60 RPM) |
| 15 | NACURE ® 1323 | 818 | 855 (30 RPM) | 1,050 (12 RPM) |
| 16 | NACURE ® 1051 | 1,140 | 1,510 (12 RPM) | 3,020 (6 RPM) |

*Spindle 62 at 60 RPM @ 25° C., 33% of scale except Control at 65% of scale
**Spindle 62 at 60 RPM @ 25° C., liquid separation at surface of control only

TABLE 6

| | CONTROL (gms) |
|---|---|
| FORMULATION:* | |
| Grind: | |
| Cargill 5770* | 111.9 |
| Tronox ® CR-800 | 476.1 |
| Methyl Ethyl Ketone | 46.1 |
| PM Acetate ® | 52.2 |
| | 686.3 |
| Grind overnight in pebble mill, 8+ on Hegman | |
| LETDOWN: | |
| Cargill 5770 | 413.2 |
| Hexamethoxymethylmelamine | 148.7 |
| DISLON ® L-1980 | 2.5 |
| PM Acetate | 390.2 |
| | 1640.9 |
| Polyester/Melamine | 75/25 |
| Pigment/Binder | 0.8/1.0 |
| Enamel Solids, Wt. % | 74 |

See Footnotes to Table 1

TABLE 7

Enamel Rheological Characteristics (1)
1.7% DNNS ® Derivatives Post Addition on Total Resin Solids

| | Example | | | |
|---|---|---|---|---|
| Shear Rate (sec-1) | 17 CONTROL | 18 NASUL ® BSB/MS | 19 NACORR ® 1151 | 20 NACORR ® 1152 |
| (Adjusted % Enamel Solids) | (73.69) | (73.69) | (73.69) | (73.69) |
| 1 | 867 | 513 | 485 | 503 |
| 2 | 760 | 531 | 475 | 489 |
| 5 | 652 | 554 | 487 | 496 |
| 10 | 583 | 557 | 497 | 505 |
| 20 | 429 | 464 | 412 | 424 |
| 10 | 466 | 475 | 415 | 425 |
| 5 | 535 | 481 | 423 | 438 |
| 2 | 676 | 499 | 452 | 466 |
| 1 | 867 | 541 | 503 | 503 |

(1) Brookfield cone-plate Viscometer, Centipoise at 25° C.

TABLE 8

LOW VOC COATINGS
with Optimum Dispersant and .7 Pigment Binder Ratio

| | Example | |
|---|---|---|
| | 38 | 39 |
| Acrylic/Polyol/HMMM | 4/56/40 | 4/56/40 |
| Polyol | K-FLEX ® 148 | K-FLEX ® 148 |
| Dispersant | KS-873N | NACORR ® 1552 |
| GRIND | PARTS PER HUNDRED | |
| Polyol | 12.3 | 12.3 |
| K-CRYL ® 200-6/MIBK | 2.6 | 2.6 |
| n-butanol | 2.6 | 2.6 |
| Dispersant | 0.3 | 0.15 |
| TiPure#R960 | 34.4 | 34.4 |
| REDUCTION | | |
| Polyol | 15.2 | 15.2 |
| CYMEL ® 303 | 19.6 | 19.7 |
| n-butyl acetate | 11.8 | 11.8 |
| NACURE ® 1419 | 1.2 | 1.2 |
| Visc., No. 4 Ford Cup,se | 30 | 30 |
| % Solids, calculated | 83.5/ | 83.5/ |
| PROPERTIES ON CR STEEL B-1000 CURED 20 MIN. AT 1.8 MIL. DFT | | |
| Cure Temperature | 335 | 325 |
| Gloss 20°/60° | 85/97 | 76/91 |
| Hardness, Pencil/Knoop | H-2H/14 | H-2H/10 |
| Impact, Reverse/Direct | 20/80 | 50/100 |

The above-mentioned patents are hereby incorporated by reference.

Many variations of this invention will suggest themselves to these skilled in this art in light of the above, detailed description. All such obvious variations are within the full intended scope of the appended claims.

We claim:

1. A nonaqueous fluid composition containing finely divided solid pigment particles and a resin, said composition comprising a dispersant selected from the group consisting of dinonylnaphthalene sulfonic acid, a salt thereof, an ester of said acid or a mixture of any of the foregoing, in an amount of from about 0.05 percent to about 0.5 percent by weight based on the weight of total resin solids.

2. A nonaqueous fluid composition as defined in claim 1 wherein said dispersant comprises dinonylnaphthalene sulfonic acid.

3. A nonaqueous fluid composition as defined in claim 1 wherein said dispersant comprises a salt of dinonylnaphthalene sulfonic acid.

4. A nonaqueous fluid composition as defined in claim 1 wherein said dispersant comprises an ester of dinonylnaphthalene sulfonic acid.

5. A nonaqueous fluid composition containing finely divided pigment solids which is a mill grind comprising
A.
  (i) a pigment
  (ii) a vehicle comprising a binder and a solvent, and
  (iii) a dispersant selected from the group consisting of a dinonylnaphthalene sulfonic acid, a salt thereof, an ester of said acid and a mixture of any of the foregoing, in an amount of from about 0.07 to about 0.7 percent by weight based on the weight of said pigment.

6. A mill grind as defined in claim 5 wherein said dispersant is present in an amount of about 0.4 percent by weight based on said pigment.

7. A mill grind as defined in claim 5 wherein said dispersant comprises a 50 percent by weight solution of zinc dinonylnaphthalene sulfonate in butyl cellosolve.

8. A nonaqueous composition containing finely divided solid pigment particles as defined in claim 5 which is an enamel further comprising
    B. a letdown vehicle comprising the same or different binder and the same or different solvent as in A. (ii).

9. An enamel as defined in claim 8 wherein said dispersant A. (iii) comprises a 50 percent by weight solution of zinc dinonylnaphthalene sulfonate in butyl cellosolve.

* * * * *